June 19, 1962 V. P. DONNER 3,039,212
HYDRAULIC APRON AND EJECTOR GATE MECHANISM FOR SCRAPERS
Filed July 11, 1960 5 Sheets-Sheet 1
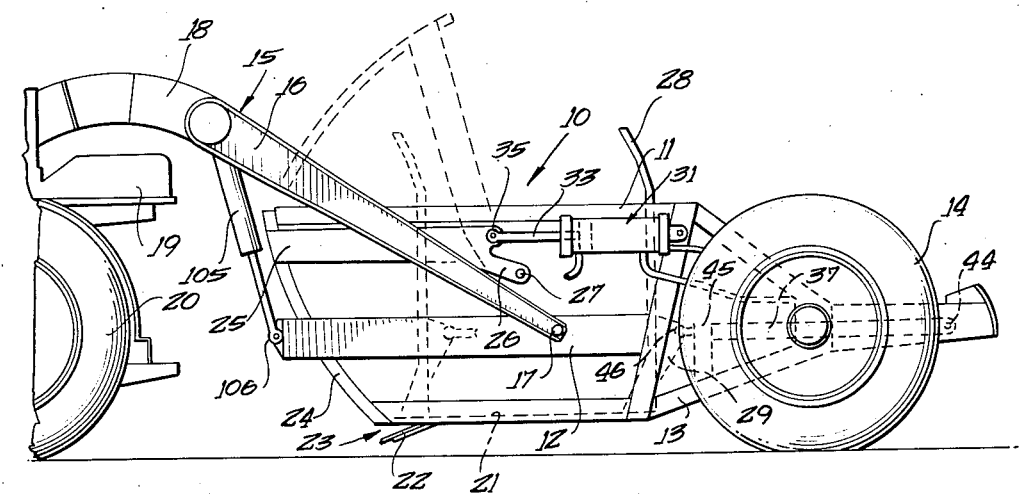
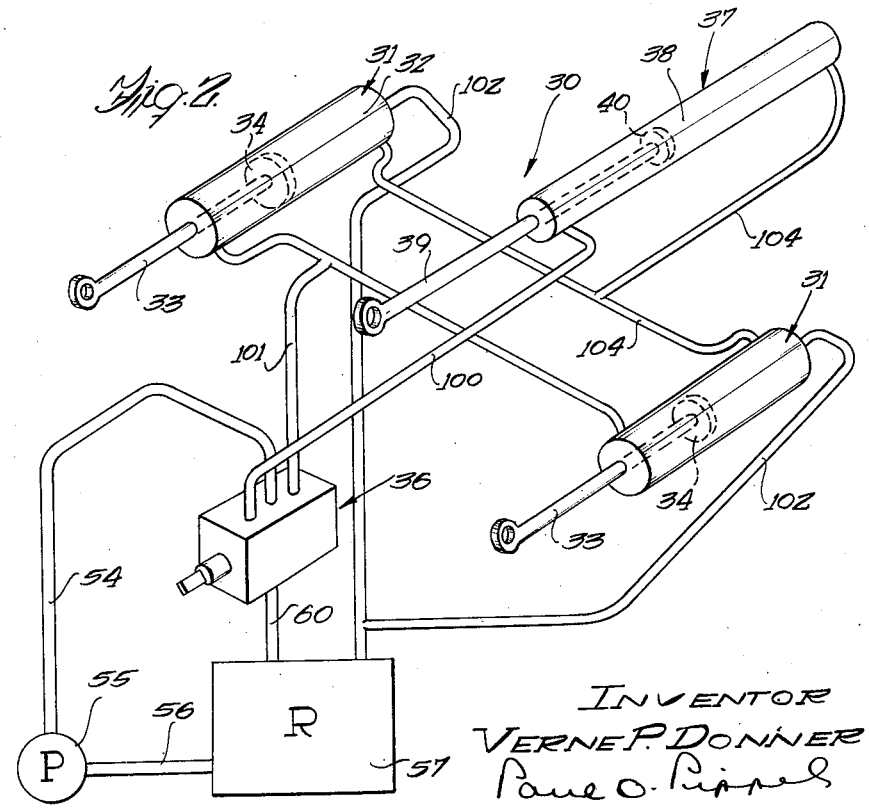
INVENTOR
VERNE P. DONNER
ATTORNEY

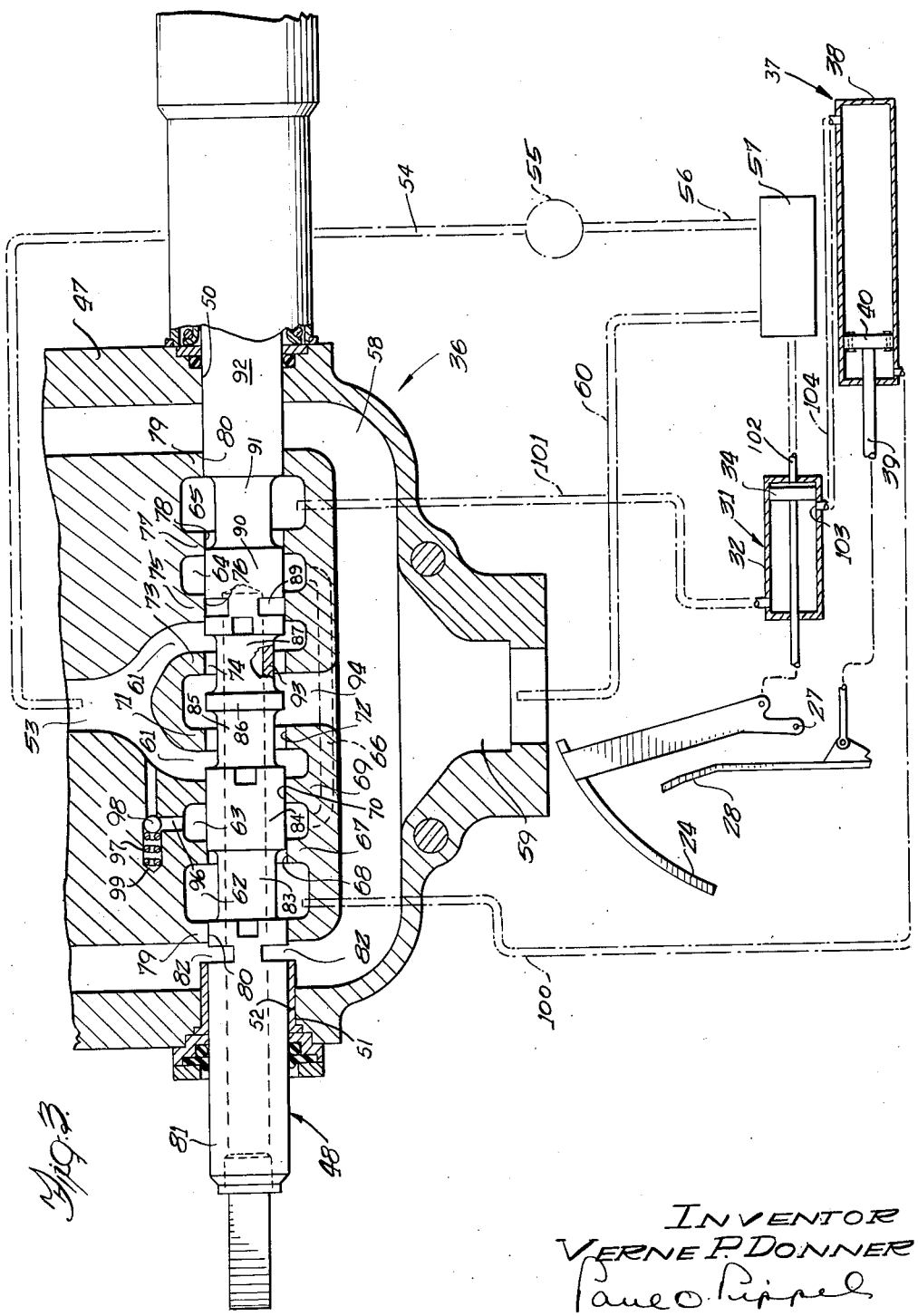

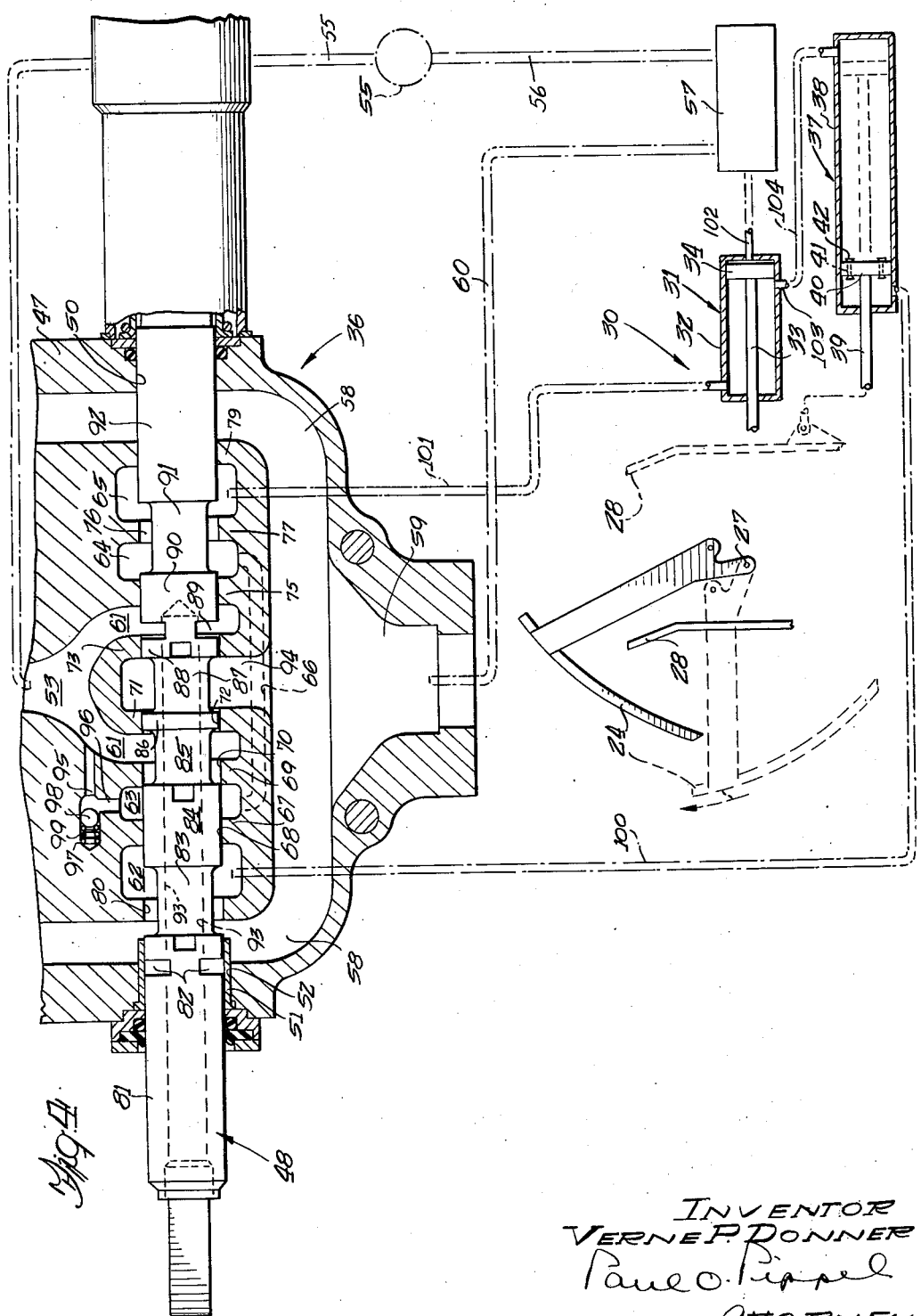

June 19, 1962    V. P. DONNER    3,039,212
HYDRAULIC APRON AND EJECTOR GATE MECHANISM FOR SCRAPERS
Filed July 11, 1960    5 Sheets-Sheet 4

INVENTOR
VERNE P. DONNER
Paul O. Pippel
ATTORNEY

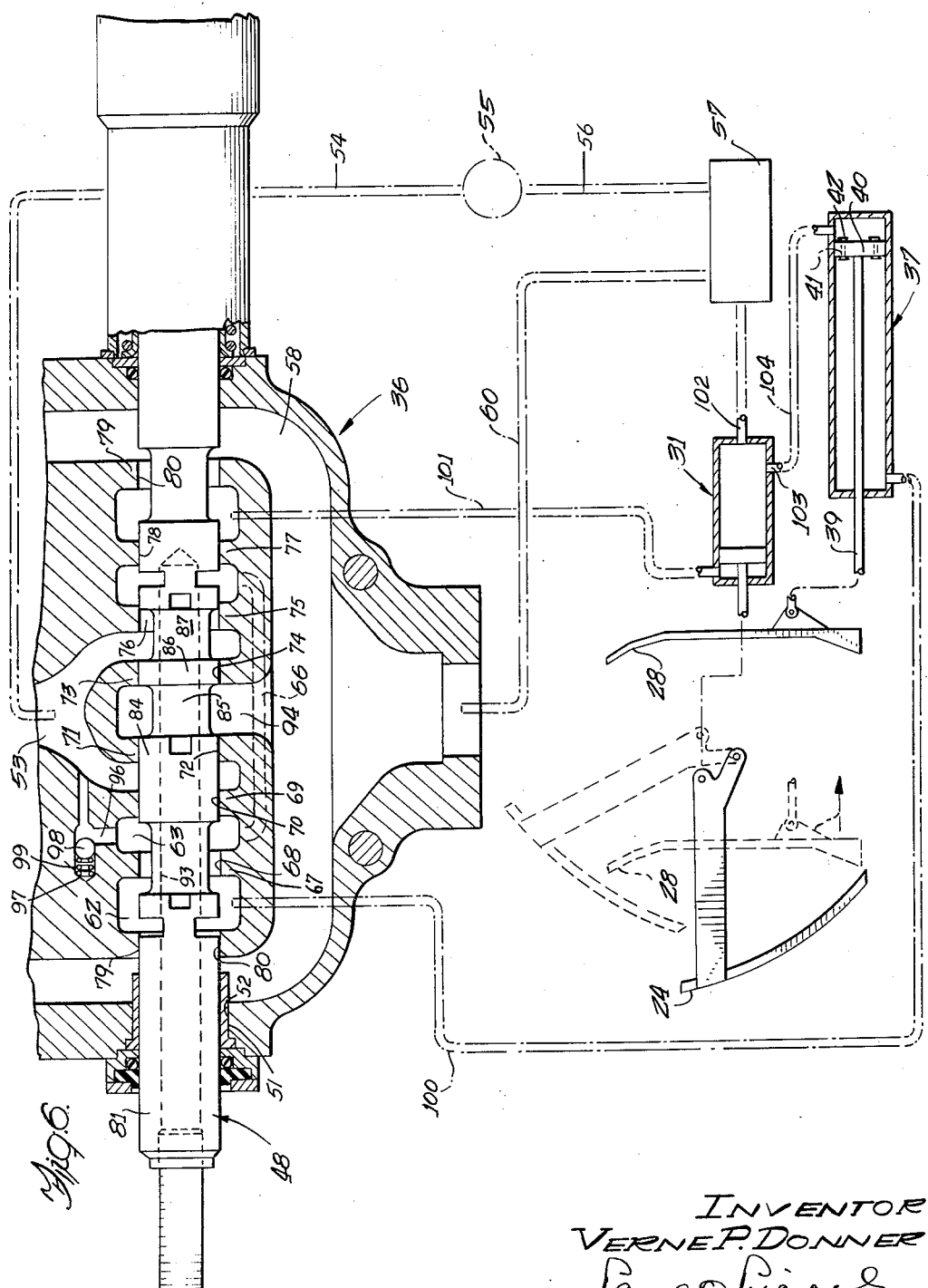

United States Patent Office

3,039,212
Patented June 19, 1962

3,039,212
HYDRAULIC APRON AND EJECTOR GATE
MECHANISM FOR SCRAPERS
Verne P. Donner, Palatine, Ill., assignor to International
Harvester Company, Chicago, Ill., a corporation of
New Jersey
Filed July 11, 1960, Ser. No. 41,897
14 Claims. (Cl. 37—129)

This invention relates to earthworking scrapers. More particularly the invention relates to an improvement in a hydraulic actuating mechanism for operating the apron and ejector gate of a scraper.

In the conventional scraper construction, two of the main operating components consist of the scraper apron which is raised during the digging and loading operation, and during ejection, and the scraper ejection gate which is advanced forwardly in the scraper bowl for discharging the load therefrom. In certain instances these operating components are actuated by means of cables which are actuated from a cable control unit mounted on a tractor to which a scraper may be attached. In other instances the operating components are actuated by means of hydraulic cylinders which are controlled from a suitable hydraulic pressure source and valve arrangement generally mounted on the tractor to which the scraper is attached. The type of tractor which is generally utilized in connection with scrapers is usually controlled in its steering movement by means of hydraulic cylinders also deriving their power from the hydraulic mechanism which is mounted on the tractor. In cases where the operating components are hydraulically actuated it is of course necessary to draw upon some of the hydraulic effort from the hydraulic mechanism and at certain instances this will effect the steering operation adversely during the times when the full hydraulic effort is desired for steering purposes. The hydraulic effort utilized for the operating components is particularly desired for raising the scraper apron to an open position and then sequentially for moving the ejector gate forwardly to a discharge position. Then in conventional machines, the apron is returned by gravity, but the ejector gate again must be retracted by the utilization of power emanating from a hydraulic system mounted on the tractor.

It is a prime object of this invention to provide a construction which permits the return or retraction of the ejector gate of a scraper without drawing upon the hydraulic power mechanism which may be provided on the tractor.

A further object is the provision of an improved hydraulic actuating mechanism which utilizes the gravity fall of the apron for imparting fluid under pressure to a gate retraction motor whereby the gate may be retracted without utilizing the hydraulic power system which is normally utilized for raising the scraper apron.

A further object of the invention is to provide a double-acting ejector cylinder for moving an ejector gate to a discharge position and for returning the same, the said ejector cylinder being operated during its retracting movement by means of forces which are available as a result of the gravity fall of a scraper apron to its closed position.

A further object of the invention is to provide means for returning an ejector to its retracted position by utilizing the energy available resulting from the gravity fall of the apron to its closed position thereby eliminating the need of helper springs and hydraulic pressures which may be available from a hydraulic system mounted on a tractor.

A still further object is the provision of an improved apron and ejector gate hydraulic operating mechanism, the said mechanism including an improved construction wherein the movement of the ejector gate to its discharge position is positively controlled to operate in sequence after the raising of the apron to its raised position.

A more specific object of the invention is to provide an improved hydraulic mechanism for raising an apron and sequentially operating an ejector gate to a discharge position, the said system comprising a hydraulic cylinder and ram operative to raise the apron, the said cylinder and ram including porting means adapted to direct fluid under pressure from said cylinder to a second cylinder which in turn includes a ram operable to move an ejector gate to a load discharge position.

A still further object is to provide an improved hydraulic actuating mechanism for raising an apron and for effecting movement of an ejector gate by the utilization of fluid extensible devices connected by a valve arrangement which assures sequential operation and which permits the utilization of the gravity fall of the apron and the energy thus achieved to retract the ejector gate to its retracted position.

These and other objects will become more readily apparent from a reading of the specification when examined in connection with the accompanying sheets of drawings.

In the drawings:

FIGURE 1 is a side elevational view of a scraper connected to a tractor and showing an improved apron and ejector gate hydraulic actuating mechanism;

FIGURE 2 is a schematic view of an improved hydraulic scraper apron and ejector gate actuating mechanism;

FIGURE 3 is a cross-sectional view through a hydraulic valve, showing in schematic form, an apron and ejector gate hydraulic mechanism with the valve in a Hold position;

FIGURE 4 is a view similar to FIGURE 3 showing a hydraulic valve in schematic arrangement with the valve in an apron Raise and an ejector gate Eject or discharge position;

FIGURE 6 is a view similar to FIGURE 5 showing a valve in a Power return position for returning an ejector gate to its retracted position.

Figure 5:
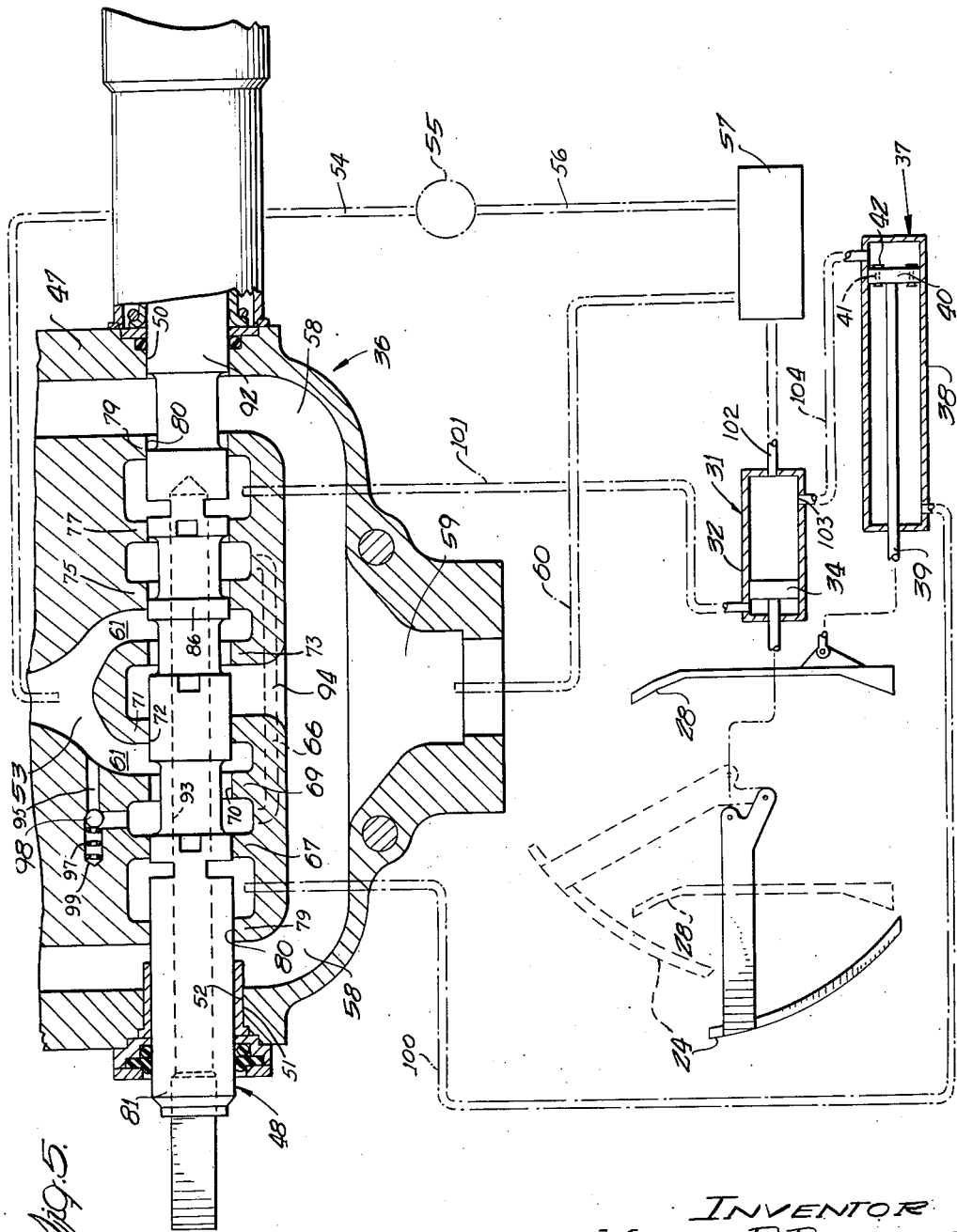
FIGURE 5 is a view similar to FIGURE 4 with a valve shown in a Float return position for returning an ejector gate to its retracted position.

Referring now to FIGURE 1, a scraper is generally referred to by the reference character 10 and includes a conventional scraper bowl 11 supported on a frame 12. The frame 12 is supported at its rear by a rear supporting structure 13 suitably mounted on ground wheels 14. The scraper also includes a draft structure generally designated at 15 which includes side arms 16 suitably pivotally connected as indicated at 17 to opposite sides of the frame 12. The draft structure 15 also includes a gooseneck 18 suitably connected to a tractor designated at 19, the said tractor 19 being suitably supported on ground wheels 20.

The scraper bowl 11 also includes a material-carrying bottom 21 having at its forward end a cutting edge 22 which extends laterally across the forward end of the bottom 21 and in effect also provides a discharge end generally designated at 23. The discharge end 23 is normally closed by means of a conventional apron 24 having side arms 25, including ears 26 which as indicated at 27 are pivotally connected to the sides of the scraper bowl 11. The bowl 11 is also provided with an ejector gate 28 which is movable from a rearward or retracted position, forwardly to a discharge position for discharging material from the discharge end 23. The ejector gate 28 is also provided on its rear side with a bracket 29.

Referring now particularly to FIGURES 2 through 6, an apron and gate actuating mechanism is designated by the reference character 30. The actuating mechanism 30 comprises a pair of fluid motors, jacks, or extensible devices 31 each of which comprises a cylinder 32 having a piston rod 33 and piston 34 which is reciprocally positioned relative to the cylinder 32. As shown in FIGURE 1, the piston rod 33 is pivotally connected, as indicated at 35, to the side arms 25 of the apron 24. In FIGURE 1 only one of the cylinder connections is shown, but it should be understood that two of the cylinders 32 are utilized though a single cylinder may also be effectively utilized.

Referring to FIGURE 2, a valve is generally designated by the reference character 36. The valve 36 is associated with a first extensible device or fluid motor 37 comprising a cylinder 38 having a reciprocating ram or piston rod 39 suitably connected to a piston 40. The extensible device 37, also referred to as a jack, etc., may be conventional and is of a two-way type in that fluid under pressure may be directed to opposite ends of the cylinder for causing movement of the ram 39 in opposed directions. The extensible device 37 is provided with suitable by-pass means in the form of bores 41 also having by-pass valves 42 which may be of conventional design and construction. The by-pass valves 42 are so arranged that when the piston is moved to its extreme opposite ends within the fluid cylinder 38, the valves 42 open and fluid is adapted to by-pass the piston 40 to the other end of the fluid cylinder 38.

As shown in FIGURE 1, the ram 39 is connected to the bracket 29 by means of a pivot connection 46. Thus during extension of the piston rod 39 the gate 28 is moved forwardly to a discharge position and during retraction of the piston rod the gate 28 is also retracted to its original position.

As shown in FIGURE 1, the extensible device 37 is also secured at its forward ends by means of a bracket 45 to the structure 13. The rear end of the extensible device 37 is suitably connected by means of a pin 44 to a rear portion of the frame structure 13.

Referring now to FIGURES 3 through 6, the valve 36 comprises a casing 47 in which a spool type valve member or plunger 48 may be reciprocated. The valve 36 may also include suitable means (not shown) for actuating the hydraulic lifting and lowering movement of the bowl 11 by means of a cylinder 105 having a suitable pivotal connection 106 to the frame 12 of the bowl. Such a construction may be conventional and is not described in detail.

The casing 47 is provided at one end with a bore 50 and is provided at its opposite end with a sleeve 51 located in a bore 52. An inlet passage for receiving fluid under pressure is designated at 53 and as shown, in FIGURE 3, a conduit 54 communicating with the inlet 53 is connected to a suitable pump 55 having a conduit connection 56 to a reservoir or suitable tank 57. Thus fluid under pressure may be directed to the inlet passage 53. Branches 58 within the casing 47 also are adapted to direct fluid to a connecting passage 59 which, in turn, is connected to a conduit 60 directing fluid to the tank 57. A cored passage 66 is adapted to provide for continual communication between the chambers 63 and 64. The inlet passage 53 also includes branches 61 laterally spaced and of U-shaped configuration.

The chambers 62 and 63 are separated by means of an annular shoulder 67 having a bore 68. One of the passages 61 is separated from the annular chamber 63 by means of an annular shoulder 69 having a bore 70. The aforementioned passage 61 is separated from a passage 94 by means of an annular shoulder 71 having a bore 72. An annular shoulder 73 having a bore 74 separates the other passage 61 from the passage 94. The latter mentioned passage 61 is separated from the passage 64 by means of an annular shoulder 75 having a bore 76. The annular chamber 64 is separated from the chamber 65 by means of an annular shoulder 77 having a bore 78. Laterally spaced annular shoulders 79 having bores 80 separate the chambers 62 and 65 from the passages 58.

The spool valve 48 comprises a land 81 having a pair of notches 82. The spool valve 48 is also provided with a circumferential groove 83 and an adjacent land 84 which is adjacent to another circumferential groove 85 separated by means of a land 86 adjacent another circumferential groove 87. The valve 48 further includes notches 89 formed in a land 90 which is adjacent with a circumferential groove 91, adjacent a land 92. As best shown in FIGURE 3, the spool valve 48 is also provided with a longitudinally extending bore 93 which communicates with the notches 82 and 89. The valve 36 also includes a bore 95 adapted to communicate with a passage 96. A bore 97 houses a ball-type check valve 98 which is normally urged against the end of the bore 95 to close the same.

The annular chamber 62 is in communication with a conduit 100 which is in communication with the forward interior of the fluid cylinder 38. The annular chamber 65 is in communication with a conduit 101 which is in communication with the forward ends of the fluid cylinders 32. Each of the fluid cylinders 32 is also provided at its rear end with a conduit 102 which leads to the reservoir 57. Each fluid cylinder 32 is provided with a port 103 communicating with a conduit 104 which leads to the rear interior end of the fluid cylinder 38.

*The Operation*

The raising and lowering of the bowl 11 may be accomplished by means of the extensible device 105 and may be conventional. The apron 24 must be raised for filling of the bowl with earth with the gate 28 in its retracted position. After the bowl 11 has been filled the apron 24 is again lowered and when the scraper has reached its destination the apron 24 is again raised and the ejector gate 28 is moved to a discharge position at the front end of the bowl 11. During loading the apron 24 is raised only a slight degree to expose the discharge end 23. Such raising for loading purposes may be accomplished by moving the spool valve 48 to the position shown in FIGURE 4, whereupon fluid under pressure within the chamber 65 is directed through conduit 101 to the fluid cylinders 32 which causes retraction of the piston rod 33 to raise the apron 24. The slight raising of the apron being accomplished the spool valve is then immediately placed in the hold position shown in FIGURE 3, whereupon the apron stays in its raised position to permit proper loading. If it is then desired to return the apron to its closed position after the loading has been achieved, the spool valve 48 is moved to the right, whereupon the annular chamber 65 is adapted to communicate with one of the passages 58 by means of the bore 80, whereupon the apron will drop by gravity. Thus has been described the operation of the apron for loading wherein the apron is opened only a slight degree.

After the scraper has reached its destination it is now desired that unloading take place. Referring to FIGURE 4, fluid under pressure enters into the passage 53 through the bore 95, passage 96, into the annular chamber 63 whereupon it flows through the bore 66 to the chamber 64 through the bore 76 and into the annular chamber 65. The fluid under pressure leaves the chamber 65 through the conduit 101 to the fluid cylinders 32, causing the piston 34 to be moved to the right or retracted position whereupon the apron 24 is raised. The pistons 34 move to the end of the cylinder 32 whereupon the ports 103 are uncovered and fluid under pressure is directed to the conduit 104 which, in turn, directs fluid under pressure to the rear of the extensible device 38, causing the piston 40 to move forwardly. As the piston moves forwardly the piston rod 39 advances the gate 28 to its discharge position. Fluid in the forward portion of the cylinder 38 is discharged into the conduit 100 and to the annular chamber 62 whereupon it is discharged to one of the passages 58 through the bore 80. The apron 24 is raised and as indicated in the figures, it is raised only to a position where it is slightly inclined or away from a dead center position so that it can drop by gravity when the fluid pressure is released. Thus it can be seen that the raising of the apron is fully achieved prior to the extension of the piston 39 so that proper sequential operation is assured. In other words the extensible device 37 is not actuated until the apron has been raised, since it is only after the port 103 is uncovered and the piston 34 has moved to its end position that communication with fluid pressure is achieved insofar as the cylinder 38 is concerned. During this movement of the piston 34 any fluid within the end of the cylinders 32 may be discharged through the conduits 102 to the tank 57.

FIGURE 3 discloses the spool valve 48 in a hold position. The valve is of a type which is termed "open center," meaning that during the hold position fluid under pressure is directed from the passage 53 through the bores 72 and 74 into the passage 94 and into the tank 57 by means of the conduit 60. A suitable return spring arrangement not described nor shown continuously urges the valve to the hold position shown wherein the land 86 is on center with respect to the passage 94. Thus the apron and the extensible devices may be held in any of the positions desired and of which they are capable.

After the load has been discharged from the bowl it is now desired to lower the apron and to retract the gate to its original position. The spool valve 48 is placed in the Float return position shown in FIGURE 5. In FIGURE 5 the passage 53 with fluid under pressure communicates through the bore 74 with the passage 94 and fluid under pressure is directed to the conduit 60 returning the same to the tank 57. As the apron falls downwardly by gravity the pistons 34 direct fluid under pressure to the conduit 101 which in turn directs fluid to the chamber 65. Fluid within the chamber 65 enters into the slots 89 which communicate with the bore 93 and the fluid is discharged into the chamber 62 by means of the slots 82. The fluid under pressure now is forced through the conduit 100 into the front end of the cylinder 38 which forces the piston 34 rearwardly causing retraction of the gate 28. The volume of the combined cylinders 32 is considerably greater than the volume of the cylinder 38 and thus the piston 34 is moved completely to the rear end of the cylinder 38 so that the gate 28 is completely retracted. As the piston 40 reaches the rear end of the cylinder 38 the by-pass valves 42 permit additional fluid to by-pass directly to the conduit 104 which in turn directs the fluid to the cylinders 32 and to the conduit 102 for return to the reservoir 57. Thus it is apparent that the gravity dropping of the apron provides the energy for forcing the fluid under pressure to effect retraction of the gate 28. Thus in this period the hydraulic system is not taxed with the task of returning the gate since the energy of the dropping apron is utilized.

It is also desired to provide a positive power return of the gate 28 in the event that for some reason or other the falling apron is insufficient to effectuate retraction of the gate 28. This power return position is shown in FIGURE 6. In FIGURE 6, as the apron drops fluid under pressure is forced through the conduit 101 to the annular chamber 65 and through the bore 80 into one of the passages 58, permitting return of the fluid to the tank 57. Fluid under pressure in the passage 53 is directed through the passage 93 into the chamber 62 by means of the slots 82 whereupon fluid under pressure is directed to the conduit 100 which in turn directs fluid under pressure to the front end of the cylinder 38 causing positive retraction of the piston rod 39 and the gate 28. Fluid on the other end of the cylinder 38 is returned through the conduit 104 and through the conduit 102 to the tank 57. Thus it is apparent that a second means of effectuating return of the gate is provided in the event that for some reason the gate 28 may stick during its retraction by means of the falling apron.

Thus it is believed that an improved actuating mechanism for actuating an apron and ejector gate of a scraper has been described and disclosed. It is believed that the objects of the invention have been fully achieved and it must be understood that changes and modifications may be made without departing from the spirit of the invention as disclosed or from the scope as defined in the appended claims.

What is claimed is:

1. For a scraper comprising a scraper bowl having a discharge end, an apron pivotally connected to said bowl and movable from a lowered to a raised position relative to said discharge end, and an ejector gate movable within said bowl from a loading position toward said discharge end to a discharge position; an apron and gate actuating mechanism comprising, a first fluid cylinder connected to said bowl, a movable ram on said cylinder connected to said apron, a second fluid cylinder on said bowl, a second movable ram on said cylinder connected to said gate, a first conduit connected to said first cylinder, a second conduit connected to said second cylinder, a third conduit connecting said first cylinder with said second cylinder, valve means associated with said first and second conduits, said valve means communicating with a source of fluid under pressure, said valve means being operable in one position to connect said first conduit with a source of fluid pressure to actuate said first ram to raise said apron, and means associated with said second cylinder and said third conduit to direct fluid under pressure from said first conduit to said second cylinder when said apron has been moved to its raised position whereupon said gate is moved toward the discharge position, said valve being movable to connect said first and second conduits whereby said apron is lowered by gravity and said first ram is moved whereby fluid in said first cylinder is forced to said second cylinder to retract said second ram and said gate is returned to its loading position.

2. For a scraper comprising a scraper bowl having a discharge end, an apron pivotally connected to said bowl and movable from a lowered to a raised position relative to said discharge end, and an ejector gate movable within said bowl from a loading position toward said discharge end to a discharge position; an apron and gate actuating mechanism comprising, a first fluid cylinder connected to said bowl, a movable ram on said cylinder connected to said apron, a second fluid cylinder on said bowl, a second movable ram on said cylinder connected to said gate, a first conduit connected to said first cylinder, a second conduit connected to said second cylinder, a third conduit connecting said first cylinder with said second cylinder, valve means associated with said first and second conduits, said valve means communicating with a source of fluid under pressure, said valve means being operable in one position to connect said first conduit with a source of fluid pressure to actuate said first ram to raise said apron, and means associated with said second cylinder and said third conduit to direct fluid under pressure from a source of pressure to said second cylinder when said apron has been moved to its raised position whereupon said gate is moved toward the discharge position, said valve being movable to connect said first and second conduits whereby said apron is lowered by gravity and said first ram is moved whereby fluid in said first cylinder is forced to said second cylinder to retract said second ram and said gate is returned to its loading position.

3. For a scraper having a bowl including a discharge end, an apron connected to said bowl and movable from a closed to a raised open position relative to said discharge end, and an ejector gate on said bowl movable advancively from a retracted to a discharge position relative to said discharge end; an apron and gate actuating mechanism comprising a first fluid actuated motor connected to said bowl and said apron, a second fluid actuated motor connected to said bowl and said gate, a source of fluid under pressure, and adjustable valve means including a first conduit connected to said first motor, a second conduit connecting said valve means and second motor, a third conduit providing communication with said first and second motors, said valve means being movable to connect said first conduit with said pressure source whereby said first motor raises said apron, and means associated with said second motor operable to direct fluid under pressure to said third conduit during raising of said apron to a predetermined position whereby said second motor advances said gate to a discharge position, said valve means being movable to connect said first and second conduits whereby said apron is lowered by gravity and said first motor discharges fluid under pressure to said second motor to retract said gate to its retracted position.

4. For a scraper in accordance with claim 3, said apron and gate actuating means including means on said valve means adapted to connect said second conduit directly with said pressure source to provide pressure in said second motor to retract said ejector gate.

5. For a scraper in accordance with claim 3, said first motor having a larger fluid capacity than said second motor.

6. For a scraper having a bowl including a discharge end, an apron connected to said bowl and movable from a closed to a raised open position relative to said discharge end, and an ejector gate movable from a retracted to a discharge position relative to said discharge end; an apron and gate actuating mechanism comprising a first fluid cylinder supported on said bowl, a first piston and ram reciprocably connected to said first cylinder, means pivotally connecting said ram to said apron, a second fluid cylinder supported on said bowl, a second piston and ram reciprocally connected to said second cylinder, means pivotally connecting said second cylinder to said gate, a source of fluid under pressure, a valve having pressure ports adapted to connect to said pressure source, a first conduit connected to said first fluid cylinder and adapted to communicate with one of said pressure ports during one position of said valve to move said first ram and piston to a position to raise said apron, a fluid connection on said first cylinder, a second conduit connected to said second fluid cylinder and said fluid connection, means associated with said first cylinder and said fluid connection to provide for communication between said first and second conduits upon movement of said first ram and piston to said position whereby fluid under pressure is directed to said second fluid cylinder to move said second piston and ram thereby moving said gate to said discharge position, a third conduit connecting said valve and said second fluid cylinder, said third conduit being adapted to communicate with a pressure port during a position of said valve, whereby fluid under pressure is directed to said second fluid cylinder to retract said gate, said valve being movable to another position to connect said first and third conduits, whereby said apron is lowered by gravity and said first piston and ram forces fluid from said first cylinder to said second cylinder to move said second piston and ram to retract said gate.

7. For a scraper having a bowl including a discharge end, an apron connected to said bowl and movable from a closed to a raised open position relative to said discharge end, and an ejector gate movable from a retracted to a discharge position relative to said discharge end; an apron and gate actuating mechanism comprising a first fluid cylinder supported on said bowl, a first piston and ram reciprocably connected to said first cylinder, means connecting said ram to said apron, a second fluid cylinder supported on said bowl, a second piston and ram reciprocally connected to said second cylinder, means connecting said second cylinder to said gate, a source of fluid under pressure, a valve having pressure ports adapted to connect to said pressure source, a first conduit connected to said first fluid cylinder and adapted to communicate with one of said pressure ports during one position of said valve to move said first ram and piston to a position to raise said apron, a fluid connection on said first cylinder, a second conduit connected to said second fluid cylinder and said fluid connection, means associated with said first cylinder and said fluid connection to provide for communication between said first and second conduits upon movement of said first ram and piston to a position whereby said apron is raised and whereby fluid under pressure is directed to said second fluid cylinder to move said second piston and ram thereby moving said gate to said discharge position, a third conduit connecting said valve and said second fluid cylinder, said third conduit being adapted to communicate with a pressure port during a position of said valve, whereby fluid under pressure is directed to said second fluid cylinder to retract said gate, said valve being movable to another position to connect said first and third conduits, whereby said apron is lowered by gravity and said first piston and ram forces fluid from said first cylinder to said second cylinder to move said second piston and ram to retract said gate.

8. For a scraper having a bowl including a discharge end, an apron connected to said bowl and movable from a closed to a raised open position relative to said discharge end, and an ejector gate movable from a retracted to a discharge position relative to said discharge end; an apron and gate actuating mechanism comprising a first fluid cylinder supported on said bowl, a first piston and ram reciprocably connected to said first cylinder, means pivotally connecting said ram to said apron, a second fluid cylinder supported on said bowl, a second piston and ram reciprocally connected to said second cylinder, means pivotally connecting said second cylinder to said gate, a source of fluid under pressure, a valve having pressure ports adapted to connect to said pressure source, a first conduit connected to said first fluid cylinder and adapted to communicate with one of said pressure ports during one position of said valve to move said first ram and piston to a position to raise said apron, a fluid connection on said first cylinder, a second conduit connected to said second fluid cylinder and said fluid connection, means associated with said first cylinder and said fluid connection to provide for communication between said first and second conduits upon movement of said first ram and piston to a position whereby said apron is raised and whereby fluid under pressure is directed to said second fluid cylinder to move said second piston and ram thereby moving said gate to said discharge position, a third conduit connecting said valve and said second fluid cylinder, said valve being movable to another position to connect said first and third conduits, whereby said apron is lowered by gravity and said first piston and ram forces fluid from said first cylinder to said second cylinder to move said second piston and ram to retract said gate.

9. For a scraper having a bowl including a discharge end, an apron connected to said bowl and movable from a closed to a raised open position relative to said discharge end, and an ejector gate movable from a retracted to a discharge position relative to said discharge end; an apron and gate actuating mechanism comprising a first fluid cylinder supported on said bowl, a first piston and ram reciprocably connected to said first cylinder, means pivotally connecting said ram to said apron, a second fluid cylinder supported on said bowl, a second piston and ram reciprocally connected to said second cylinder, means pivotally connecting said second cylinder to said gate, a source of fluid under pressure, a valve connected to said pressure source, a first conduit connected to said first fluid cylinder and adapted to communicate with said valve during one position of said valve to move said first ram and piston to a position to raise said apron, a fluid connection on said first cylinder, a second conduit connected to said second fluid cylinder and said fluid connection, means associated with said first cylinder and said fluid connection to provide for communication between said first and second conduits upon movement of said first ram and piston to said position whereby fluid under pressure is directed to said second fluid cylinder to move said second piston and ram thereby moving said gate to said discharge position, a third conduit connecting said valve and said second fluid cylinder, said third conduit being adapted to communicate with said valve whereby fluid under pressure is directed to said second fluid cylinder to retract said gate, said valve being movable to another position to connect said first and third conduits, whereby said apron is lowered by gravity and said first piston and ram forces fluid from said first cylinder to said second cylinder to move said second piston and ram to retract said gate.

10. For a scraper having a bowl including a discharge end, an apron pivotally connected to said bowl and movable between open and closed positions relative to said discharge end, and an ejector gate movable in said bowl from a retracted to a discharge position relative to said discharge end; an apron and gate actuating mechanism comprising a first fluid motor associated with said bowl and connected to said apron for raising the same to an open position, a source of fluid pressure, a first fluid connection to said first motor, a second fluid motor associated with said bowl and connected to said gate for moving the same, a second fluid connection to said second motor, a third fluid connection interconnecting said first and second fluid motors, and valve means movable to connect said first connection with said fluid pressure source whereby said first motor raises said apron, and means associated with said motors to direct fluid from said pressure source to said third connection and to said second motor when said apron has reached a predetermined raised position, and said second motor is actuated to move said gate to a discharge position, said valve means being movable to connect said second connection with said pressure source to actuate said second motor to move said gate to a retracted position.

11. For a scraper having a bowl including a discharge end, an apron pivotally connected to said bowl and movable between open and closed positions relative to said discharge end, and an ejector gate movable in said bowl from a retracted to a discharge position relative to said discharge end; an apron and gate actuating mechanism comprising a first fluid motor associated with said bowl and connected to said apron for raising the same to an open position, a source of fluid pressure, a first fluid connection to said first motor, a second fluid motor associated with said bowl and connected to said gate for moving the same, a second fluid connection to said second motor, a third fluid connection interconnecting said first and second fluid motors, and valve means movable to connect said first connection with said fluid pressure source whereby said first motor raises said apron, and means associated with said motors to direct fluid from said pressure source to said third connection and to said second motor, when said apron has reached a predetermined raised position and said second motor is actuated to move said gate to a discharge position, said valve means being movable to connect said first and second fluid connections whereupon lowering of said apron by gravity, fluid under pressure is discharged from said first motor to said second motor to actuate the second motor to move said gate to a retracted position.

12. For a scraper having a bowl including a discharge end, an apron pivotally connected to said bowl and movable between open and closed positions relative to said discharge end, and an ejector gate movable in said bowl from a retracted to a discharge position relative to said discharge end; an apron and gate actuating mechanism comprising a first fluid extensible device supported on said scraper and connected to said apron, a second fluid extensible device supported on said scraper and connected to said ejector gate, a source of fluid under pressure, valve means including a pressure port communicating with said fluid pressure source, a first fluid conduit connected to said valve means and to said first extensible device, a second conduit connected to said valve means and said second extensible device, a third conduit connecting said first and second extensible devices, said valve means being operable to connect said pressure port with said first conduit to actuate said first extensible device to raise said apron, and means associated with said first extensible device constructed and arranged to connect said pressure port with said third conduit to deliver fluid under pressure to said second fluid extensible device at a predetermined raised position of said apron, said first fluid extensible device having a greater capacity than said second fluid extensible device.

13. For a scraper, an apron and gate actuating mechanism in accordance with claim 12, said valve means being movable to connect said first conduit with said second conduit whereupon lowering of said apron by gravity, said fluid in said first extensible device is discharged to said second extensible device to actuate the same for retracting said ejector.

14. For a scraper, an apron and gate actuating mechanism in accordance with claim 13, including means on said valve means adapted to connect said pressure port with said second conduit to direct fluid under pressure from said fluid source to said second extensible device during the lowering of said apron by gravity, and during the connection of said first conduit with said second conduit.

References Cited in the file of this patent
UNITED STATES PATENTS

| | | |
|---|---|---|
| 2,052,248 | Roehm | Aug. 25, 1936 |
| 2,271,790 | Allin | Feb. 3, 1942 |
| 2,277,640 | Harrington | Mar. 24, 1942 |
| 2,307,544 | Robinson | Jan. 5, 1943 |
| 2,335,231 | Armington | Nov. 30, 1943 |
| 2,677,202 | Gustafson | May 4, 1954 |
| 2,946,144 | Anderson | July 26, 1960 |